Sept. 7, 1948.  E. A. STALKER  2,449,022
FUEL SYSTEM FOR AIRCRAFT POWER PLANTS FOR AIRCRAFT
PROPULSION AND BOUNDARY LAYER AIR CONTROL
Filed March 12, 1945

INVENTOR.
Edward A. Stalker
BY

Patented Sept. 7, 1948

2,449,022

UNITED STATES PATENT OFFICE 2,449,022

FUEL SYSTEM FOR AIRCRAFT POWER PLANTS FOR AIRCRAFT PROPULSION AND BOUNDARY LAYER AIR CONTROL

Edward A. Stalker, Bay City, Mich.

Application March 12, 1945, Serial No. 582,394

1 Claim. (Cl. 244—40)

My invention relates to aircraft and in particular to wings employing boundary layer control.

It has as an object to provide a thermal means of boundary layer control for increasing the lift coefficient at the time of landing.

Another object is to increase the reliability of a source of power for operating the boundary layer blower.

Another object is to provide a means of increasing the lift of the wing by a boundary layer control means which will reduce the sinking velocity of the airplane.

Other objects will appear from the description and drawings.

I accomplish the above objects by the means illustrated in the accompanying drawings in which—

Figure 1:
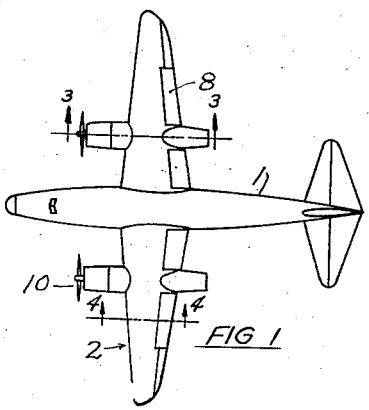
Figure 1 is a top plan view of an aircraft.
Figure 2:
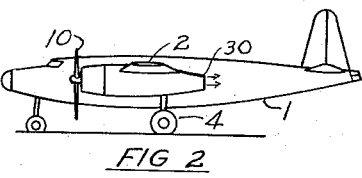
Figure 2 is a side elevation of the aircraft.
Figure 4:
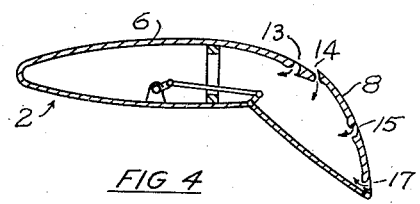
Figure 4 is a section along the line 4—4 in Figure 1 with the flap down.

When the lift of a wing is increased by boundary layer control, the induced drag assumes a large value being proportional to the square of the lift. Thus when values of the lift coefficient of the order of 5 are used instead of the conventional values of about 2 available with an ordinary flapped wing, the induced drag is multiplied by 6.25 and the lift by 2.5. This results in a large reduction of the ratio of lift to drag which substantially increases the gliding angle. Thus instead of the vertical velocity being, for instance, ⅛ the landing velocity it becomes ½.4 the landing velocity. If the permissible landing speed is 80 m. p. h. the vertical velocity in the first case would be 10 m. p. h. while in the second case it would be about 33.7 m. p. h. The landing gear and the airplane structure would have to absorb about 11 times as much energy since this energy varies with the square of velocity. As a result airplanes equipped with boundary layer controlled wings capable of such high lift coefficients have a high rate of vertical descent, making it difficult to absorb the vertical shock with a reasonable stroke of the shock absorber. It is the object of this invention to induct the boundary layer to increase the lift and then discharge it rearward at a velocity which will provide a thrust which in effect reduces the drag and therefore increases the lift-drag ratio when the aircraft is landing under gliding conditions and with its main power supply inoperative. This makes it possible to control the gliding angle and to establish a flatter gliding angle since the tangent of the angle is the ratio of drag to lift. A flatter gliding angle means less vertical velocity component which can thus be brought within proper limits such that the plane can be successfully landed with landing gear of the conventional type.

The increase in induced drag becomes significant when the lift is large, such as arises from a wing whose airfoil section has such a high arching of the mean camber line that the flow will not follow the upper surface without substantial boundary layer control. This occurs for a mean camber line maximum ordinate above its subtending chord greater than 12 per cent of the said chord length. This value requires a power driven blower to control the boundary layer.

In a wing equipped with both induction and discharge slots the air discharged out of the slots in the wings will not give the necessary thrust because the velocity is low and the jets are directed almost vertically downward when they leave the trailing edge of the wing. It is their direction just past the trailing edge which determines the reaction on the wing.

I therefore use induction slots in the aft portion of the wing surface and a means to eject the air as a substantially horizontal jet.

In the drawings the fuselage of the aircraft is 1, the wing is 2 and the landing gear is 4. The wing has the main body 6 and the flap 8.

The airplane is propelled by the propeller 10 operably connected to the thermal engine 12.

At landing the flap 8 is lowered and the boundary layer is inducted through slots 13, 14, 15 and 17 by the compressor 16 in communication with the wing interior by means of duct 18. After compression the air is discharged into the combustion chamber 20 where fuel is introduced by the fuel nozzle 22. Means are provided for initiating combustion which then continues of itself. The products of combustion or gas pass into the gas turbine 24 and rotate its rotor and shaft 26 which is connected to the rotor shaft 28 of the compressor. The gas is discharged from the turbine exit 30 as a jet exerting a forward thrust on the aircraft.

It is to be understood that I prefer to pass the products of combustion, from burning fuel in the inducted air, into the turbine to generate power before emitting them from the airplane, but it is also contemplated that the products of combustion might be discharged directly to produce a greater thrust and other means than the turbine be provided to drive the compressor.

The depression of the flap in conjunction with the slot flow gives rise to a very large lift coefficient and also a very large drag. This invention provides that this drag on the airplane is in part balanced by the thrust from the gas jet so that the ratio of lift to the difference between the drag and thrust is sufficiently high that a large vertical velocity component at landing is avoided as explained earlier.

The reliability of the lift augmenting device is further enhanced by providing for the compressor and turbine to be driven by the shaft 32, and clutch 34 connected to the engine shaft 36.

The fuel tank 40 for the combustion chamber 20 is arranged to be independent of the fuel tank 44 which feeds the main engine 12. That is fuel cannot be taken from the auxiliary tank into the main engine. On the other hand the auxiliary tank always contains fuel since it is filled from the main tank by the tube 46 having the one-way or check valve 48. That is, fuel will always flow from the main tank into the auxiliary tank but the reverse flow is not possible. Thus the auxiliary tank will always be full and the pilot cannot make the error of being without fuel for effecting a low speed landing.

The turbine 24 is normally started by rotating the shaft 28 of the compressor by means of the electric motor 50 connected to this shaft by the transmission 52 containing an over-running clutch so that after the turbine gets up to speed the motor is not used. In flight with the engine 12 operating the turbine can be started by this engine. The turbine may also be started by using the propeller 10 as a windmill.

Figure 5:
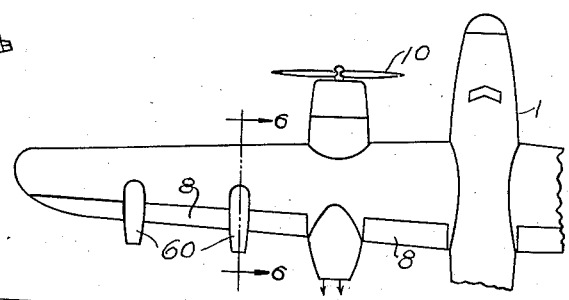
Figure 5 is a plan view of another form of the invention.
Figure 3:
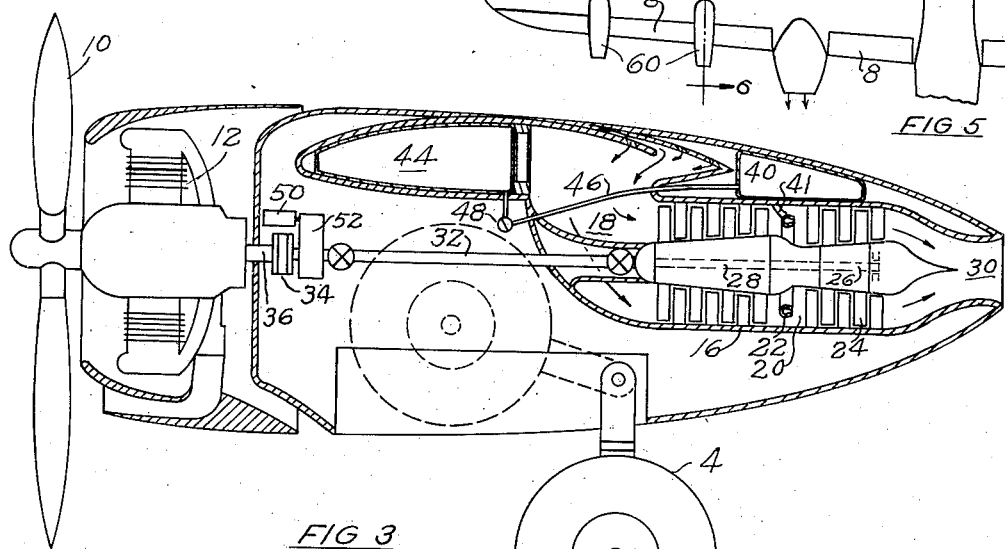
Figure 3 is a section along the line 3—3 in Figure 1.
Figure 6:
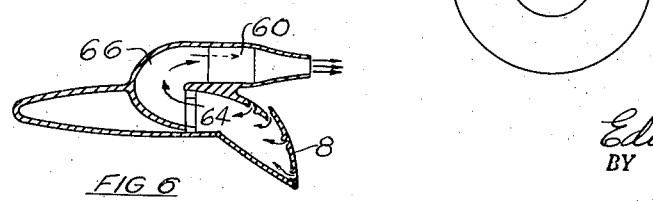
Figure 6 is a section along the line 6—6 in Figure 5.

In another form of the invention shown in Figures 5 and 6 small jet units 60 are distributed along the span of the wing. The inlet of each is in communication with the wing interior 64 via the duct 66 so that the boundary layer is inducted through the slots in the flap 8.

By placing a number of units along the span the inducted air has a short path to each unit, thereby conserving the energy in the internal flow.

The jet engine is uniquely suited for handling the boundary layer since it is light in weight and can be stowed in space not normally required for other machinery or cargo.

The jet engine can be used to assist the take-off of the aircraft and therefore make feasible the use of a higher lift coefficient of the wing during this operation.

It is a feature of the fuel system provided that fuel used from the auxiliary tank 40 during take-off is coincidentally replaced by the tube connection between the tanks. At the beginning of the flight there is assurance that there is ample fuel to do this. It is done automatically and the system prevents use of this fuel in the main engine.

It will now be clear that I have provided a unique means of controlling the boundary layer on the wing so as to provide great reliability and a large reduction in the vertical component of the landing velocity.

While I have illustrated a specific form of this invention it is to be understood that I do not intend to limit myself to this exact form but intend to claim my invention broadly as indicated by the appended claim.

What is claimed is:

In an aircraft adapted for operation with boundary layer control and having a source of propulsive power for propelling the aircraft in normal flight, the combination of a wing having a slot in its surface leading into the wing interior, a main fuel tank for supplying fuel directly to said propulsive power source, means communicating with said slot for inducting the boundary layer air on said wing surface provided for operation of the aircraft with boundary layer control including a second power source for operating said inducting means, a separate auxiliary fuel tank, means continuously communicating between said main tank and said auxiliary tank for supplying said auxiliary tank from said main tank, means for supplying fuel from said auxiliary fuel tank directly to said second power source, and means preventing return flow of fuel from said auxiliary tank to said main tank to assure the presence of fuel in said auxiliary tank notwithstanding depletion of fuel in said main fuel tank for the operation of said second power source to enable the operation of the aircraft with boundary layer control.

EDWARD A. STALKER.

REFERENCES CITED

The following references are of record in the file of this patent:

UNITED STATES PATENTS

| Number | Name | Date |
|---|---|---|
| 1,364,770 | Lindberg | Jan. 4, 1921 |
| 1,854,043 | Korner | Apr. 12, 1932 |
| 2,149,298 | Kuzelka | Mar. 7, 1939 |
| 2,252,528 | Sikorsky et al. | Aug. 12, 1941 |
| 2,272,664 | Gropler | Feb. 10, 1942 |

FOREIGN PATENTS

| Number | Country | Date |
|---|---|---|
| 390,363 | Great Britain | Apr. 6, 1933 |
| 512,064 | Great Britain | Aug. 29, 1939 |
| 548,898 | Great Britain | Oct. 28, 1942 |

OTHER REFERENCES

"Flight" magazine, January 13, 1944, pages 39–40.